United States Patent
Trujillo (10) Patent No.: US 8,824,884 B1
(45) Date of Patent: Sep. 2, 2014

(54) SECURITY CAMERA ENCLOSURE (71) Applicant: David W. Trujillo, Odessa, TX (US)

(72) Inventor: David W. Trujillo, Odessa, TX (US)

(*) Notice: Subject to any disclaimer, the term of this patent is extended or adjusted under 35 U.S.C. 154(b) by 0 days.

(21) Appl. No.: 13/691,453

(22) Filed: Nov. 30, 2012

(51) Int. Cl.
*G03B 17/02* (2006.01)
*G03B 17/08* (2006.01)

(52) U.S. Cl.
CPC ............ *G03B 17/02* (2013.01); *G03B 17/08* (2013.01)
USPC .......................................... 396/539; 396/427

(58) Field of Classification Search
CPC ........................................................ G03B 7/26
USPC .................................. 396/427, 539
See application file for complete search history.

(56) References Cited

U.S. PATENT DOCUMENTS

| | | | | |
|---|---|---|---|---|
| 6,585,428 | B1* | 7/2003 | Wesselink et al. | 396/427 |
| 6,643,456 | B1* | 11/2003 | Ryan et al. | 396/25 |
| 2005/0232624 | A1* | 10/2005 | Baldwin | 396/278 |
| 2007/0019941 | A1* | 1/2007 | Cross et al. | 396/263 |
| 2009/0196597 | A1* | 8/2009 | Messinger et al. | 396/427 |
| 2011/0242315 | A1* | 10/2011 | Barley et al. | 348/143 |
| 2013/0177303 | A1* | 7/2013 | Pierce et al. | 396/427 |

* cited by examiner

*Primary Examiner* — Clayton E. LaBalle
*Assistant Examiner* — Dennis Hancock
(74) *Attorney, Agent, or Firm* — Buskop Law Group, PC; Wendy Buskop

(57) ABSTRACT

A security camera enclosure that includes an internal power source that is protected from being tampered with. The internal power source is located within a battery box. The battery box is disposed within an outer housing. The outer housing also houses a camera, a communication device, and a battery control system.

16 Claims, 7 Drawing Sheets

SECURITY CAMERA ENCLOSURE

FIELD

The present embodiments generally relate to a security camera enclosure.

BACKGROUND

A need exists for a security camera enclosure that can be mounted on a pole and has a power system integrated therewith. The integrated power system eliminates the possibility of power delivery being interrupted by tampering of external power transmission lines.

A further need exists for a security camera enclosure that can isolate electronic components from batteries within the enclosure, eliminating degradation of the electronic components due to outgas sing of the battery.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments generally relate to a security camera enclosure.

The security camera enclosure can include an outer housing. The outer housing can have an internal cavity.

The outer housing can have an access opening formed therein. The access opening can be selectively opened or closed using a secure access door connected with the outer housing. The secure access door can selectively block the access opening.

The secure access door can have a lock that can prevent the access opening from being opened without proper authorization. The lock can be a key lock, a combination lock, a digital lock, or the like.

The outer housing can be mounted to a building, pole, or other structure using a first mounting flange located on a first portion of the outer housing and a second mounting flange located on a second portion of the outer housing.

An external data port can be located on the outer housing. The external data port can include a communication line. The communication line can have a first end connected with one or more components within the outer housing and can have a second end connected with a device.

The device at the second end of the communication line can be an Ethernet port, a phone jack, a cable port, a fiber optic port, another type of communication port, a male female connector, or combinations thereof. The device can connect with an external device.

The external device can be a computer, a lap top, a cellular phone, or other like devices. The communication cable can have a sealing device disposed thereabout that can provide a seal.

In one or more embodiments, the data port can be configured to handle different kinds of telemetry by having different connectors and cables connected with components within the outer housing.

The outer housing can also have an external power port formed therein. The external power port can be an AC power port, a DC power port, or combinations thereof. The external power port can be configured to receive power from any number of external power sources.

The external power port can be a hole formed through the outer housing configured to receive a cable connected with an external power source. The cable can be configured to connect to one or more components within the outer housing. The cable can have a sealing device disposed thereabout that can provide a seal when the cable is disposed through the external power port.

In another embodiment, the external power port can be a fixed connector in communication with one or more components within the outer housing. The fixed connector can be any connector. The fixed connector can be configured to receive a cable connector. The cable connector can be connected with a cable in communication with an external power source.

A bottom portion of the outer housing can have a viewing hole formed therein.

One or more water proof vents can be located on the outer housing. The water proof vents can provide communication between the inner cavity of the outer housing and an external environment.

A camera can be disposed within the outer housing. The camera can be connected with the battery. The camera can be supported within the outer housing by a camera housing. The camera can have a lens operatively aligned with the viewing hole.

A protective cover can be disposed about the viewing hole to protect the lens on the camera and to seal the viewing hole. The protective cover can be connected with the outer housing. A seal or gasket can be disposed between the protective cover and the outer housing.

A battery box can be located within the outer housing. The battery box can be aligned with a battery box opening formed in the outer housing. The battery box can be connected with an inner surface of the outer housing and aligned with the battery box opening. The battery box can have a top, two sides, and a front. The back can be open, allowing venting through the battery box opening.

A battery box door can be connected with the outer housing. The battery box door can selectively block the battery box opening. The battery box door can have a battery box lock. The battery box lock can be a key lock, a combination lock, a digital lock, or the like. The battery box door is configured to allow venting of gasses from the batteries when it is blocking the battery box opening.

One or more batteries can be located within the battery box. The batteries can be lithium batteries, gel cells, lead, or other batteries known in the art. The batteries can have a voltage of from about 5 volts to about 24 volts. The batteries can include one or more cells.

A power controller, known to those skilled in the art with the aid of this disclosure, can be connected with the external power port and the battery control system. The power controller can be a hybrid controller, a solar controller, or the like. The power controller can be connected with the batteries and the external power source via the external power port. The power controller can manage the charge of the batteries and disperse power to a battery control system.

In one or more embodiments, the power controller can monitor the battery. When the batteries have a charge below a predetermined level, the power controller can shut power off to all components and direct all external power to the batteries. The power can remain off to all components and all external power can be directed to the batteries until the batteries have a charge above the predetermined level. After the batteries have a charge above the predetermined level, the power controller can turn all the components back on. The predetermined charge level can be determined by data provided by the battery manufacture or by publically available data.

In one or more embodiment, if the battery charge is low, the power controller can stop drawing power from the battery and direct power from the external power source to the components within the outer housing and to the battery. If the battery charge level is high, the power controller can draw power from the battery and prevent power transmission to the battery from the external power source. Software can operate the power controller. The software would be known to one skilled in the art with the aid of this disclosure.

A battery control system can be in communication with the power controller. The battery control system can be in communication with components within the outer housing that need power, such as the camera, fans, switch, and communication device. The battery control system can be a fuse box that can turn on or off to control transmission of power to connected components. The battery control system can be any power distribution device known in the art. The battery control system can be similar to that used for ignition switches on motorcycles.

One or more fans can be disposed within the outer housing. The one or more fans can be used to provide cooling within the outer housing.

A communication device can be in communication with the camera. The communication device is configured to communicate with remote devices. The communication device can have a receiver and transceiver. The communication device can be a modem. Illustrative communication device can include cellular transceiver and receiver, Wi-Fi modem, a satellite link, or the like.

A switch can be used to connect the communication device with the external data port, the camera, and the battery control system. The switch can be any device configured to control data communication between multiple components, such as a router.

The camera, switch, and the communication device can be powered by the battery and, the external power source, or combinations thereof.

The external power source can be a solar system, a generator, a wind system, grid power, or combinations thereof.

Figure 1:
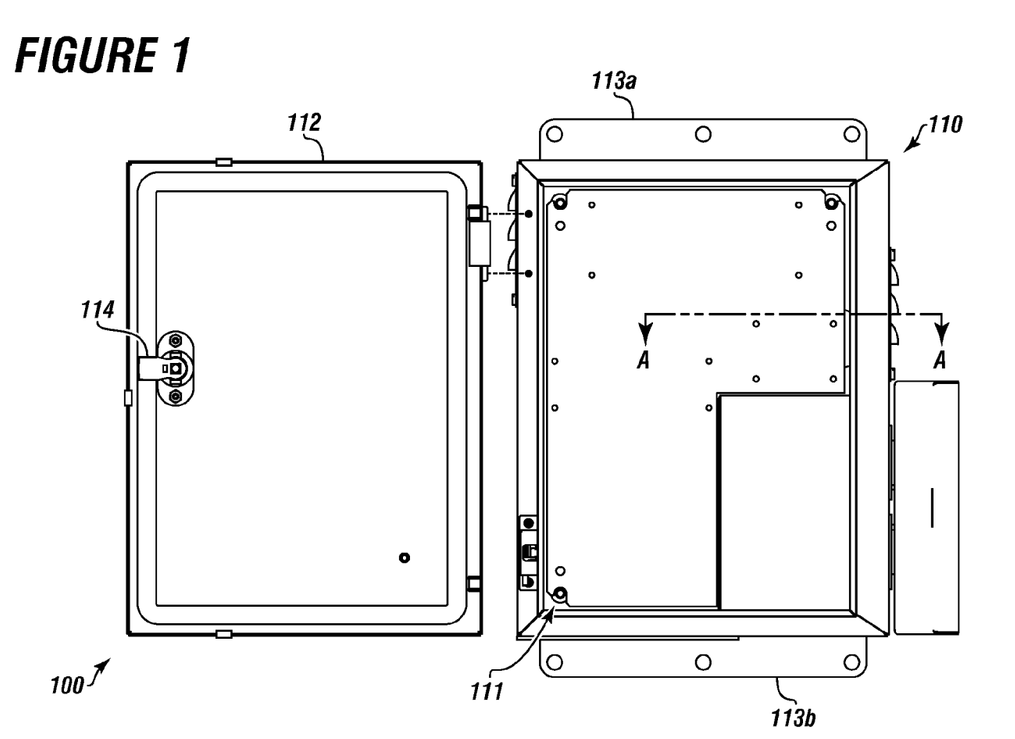
FIG. 1 depicts a front view of a security camera enclosure.

Turning now to the Figures, FIG. 1 depicts a front view of a security camera enclosure.

The security camera enclosure 100 can include an outer housing 110.

An access opening 111 can be formed in the outer housing 110 providing access to the inner cavity of the outer housing 110. The access opening 111 can be selectively opened and closed using an access door 112. The access door 112 can be hinged or otherwise connected with the outer housing 110.

The access door 112 can include a lock 114.

A first mounting flange 113a can be connected to a first portion of the outer housing 110, and a second mounting flange 113b can be connected to a second portion of the outer housing 110. The first mounting flange 113a and the second mounting flange 113b can have one or more mounting holes formed therein.

Figure 2:
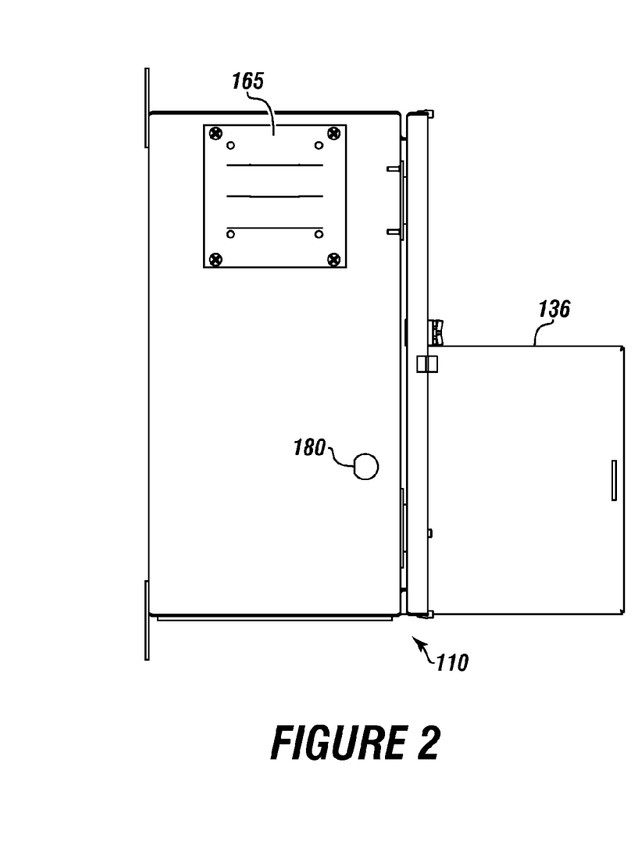
FIG. 2 depicts a first side view of the security camera enclosure of FIG. 1.

FIG. 2 depicts a first side view of the security camera enclosure of FIG. 1.

The outer housing 110 can have an external data port 180 formed therein. The external data port 180 can be located on the first side as depicted or on another portion of the outer housing.

A first water proof vent 165 can be located on the outer housing 110. The first water proof vent 165 can allow for air circulation within the outer housing 110.

A battery box door 136 can be secured to the outer housing 110.

Figure 3:
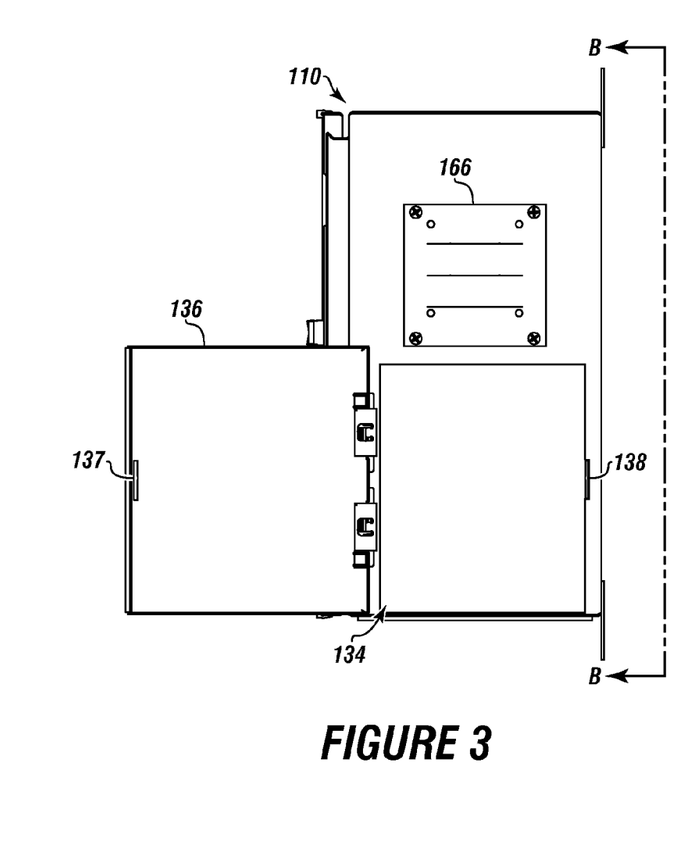
FIG. 3 depicts a second side view of the security camera enclosure of FIG. 1.

FIG. 3 depicts a second side view of the security camera enclosure of FIG. 1.

The outer housing 110 can include a second water proof vent 166. The second water proof vent 166 can allow for air circulation within the outer housing 110.

A battery box opening 134 can be located in the outer housing 110. The battery box opening 134 can be located on the second side of the outer housing 110 as depicted or can be located on other parts of the outer housing 110.

The battery box door 136 can be connected with the outer housing 110. The battery box door 136 can be used to selectively block the battery box opening 134. The battery box door 136 can be configured to allow gases to vent out of the battery box opening 134 even when the battery box door is blocking the battery box opening 134.

The battery box door 136 can have a battery box lock mechanism for locking it. For example, the battery box door 136 can have a perforation 137 that can receive a protrusion 138 and a lock can be placed through a hole in the protrusion.

Figure 4:
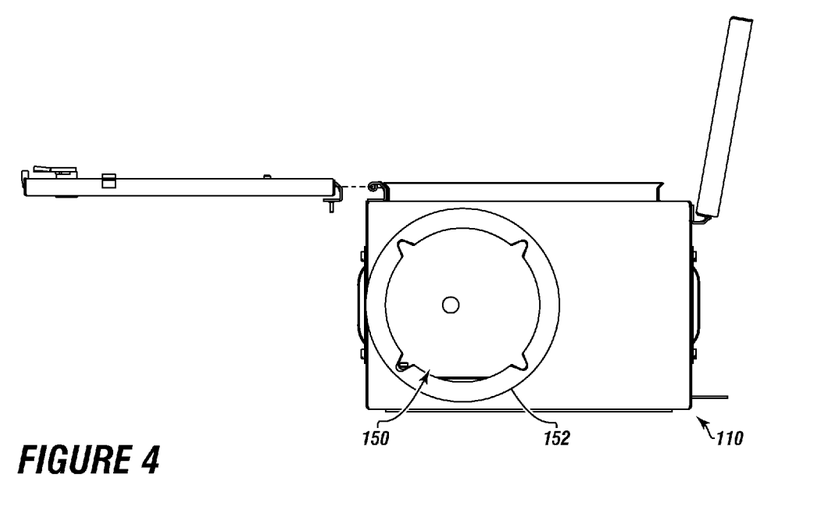
FIG. 4 depicts a bottom view of the security camera enclosure of FIG. 1.

FIG. 4 depicts a bottom view of the security camera enclosure of FIG. 1.

The outer housing 110 can have a viewing hole 150 formed on a bottom portion thereof.

A gasket 152 can be disposed about the viewing hole 150.

Figure 5:
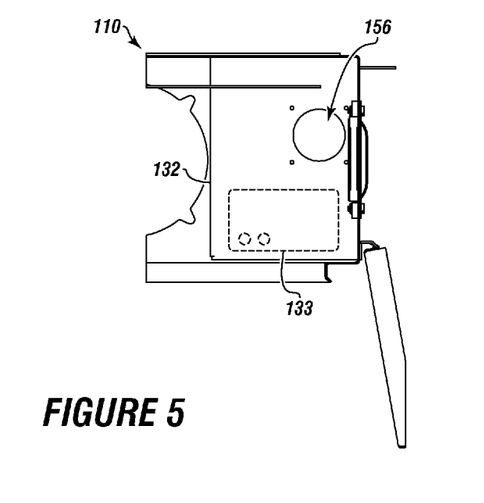
FIG. 5 depicts a top view of a battery box and the security camera enclosure cut along line A-A of FIG. 1.

FIG. 5 depicts a top view of a battery box and the security camera enclosure 100 cut along line A-A of FIG. 1.

A battery box 132 can be located within the outer housing 110. The battery box 132 can be secured to the inner surface of the outer housing 110. The battery box 132 can have a battery box through hole 156 formed through a portion thereof. The battery box through hole 156 can allow communication lines, such as power transmission lines and data communication lines, to be placed into the battery box 132. A seal can be placed about the lines running through the battery box through hole 156, and the seal can seal off the box through hole 156 when the lines are operatively connected within the battery box 132.

One or more batteries 133 can be located in the battery box 132.

Figure 6:
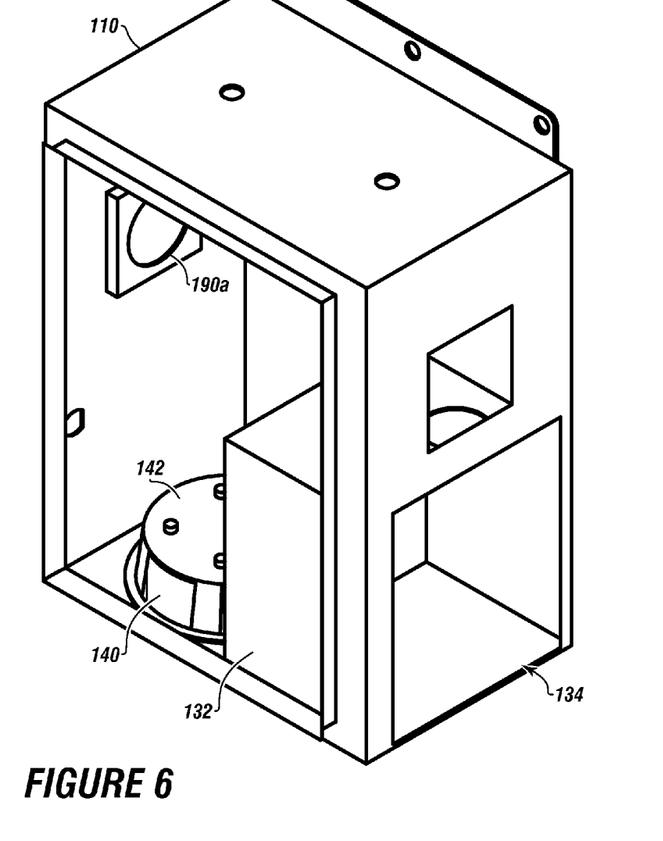
FIG. 6 depicts an isometric view of the security camera enclosure of FIG. 1.

FIG. 6 depicts an isometric view of the security camera enclosure of FIG. 1.

The outer housing 110 can have a camera 140 secured therein by a camera housing 142. The camera 140 can have a lens operatively aligned with the viewing hole.

One or more fans, a first fan 190a can be seen in this Figure, can be located within the outer housing 110. The fans can help circulate air within the outer housing 110.

The battery box 132 can be aligned with the battery box opening 134 when the battery box 132 is installed within the outer housing 110.

Figure 7:
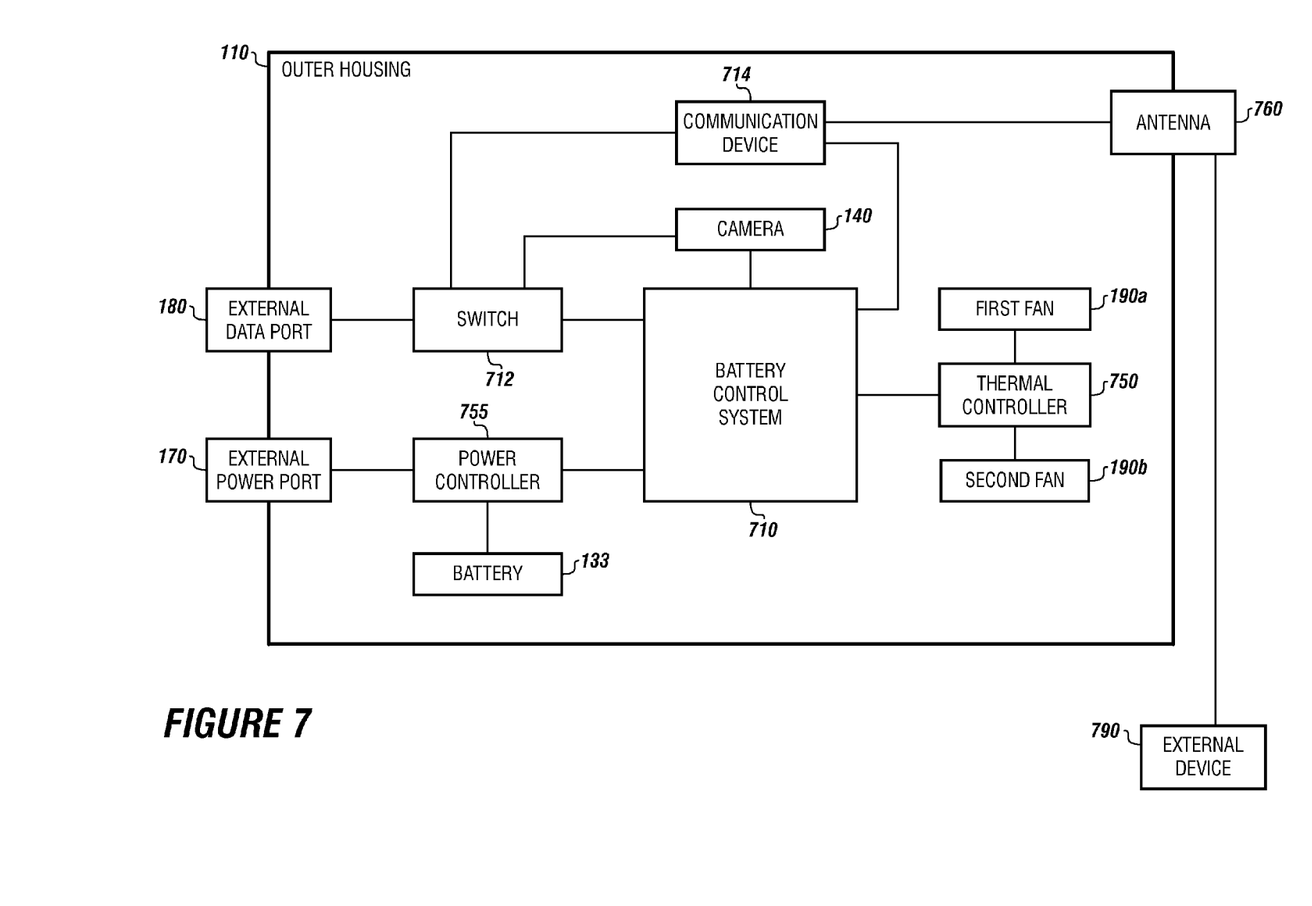
FIG. 7 depicts a schematic of components within a security camera enclosure.

FIG. 7 depicts a schematic of components within a security camera enclosure.

A battery control system 710 can be located within the outer housing 110. The battery control system 710 can be a fuse box.

The battery control system 710 can provide power and be in communication with the camera 140, a thermal controller 750, a communication device 714, and a power controller 755.

The thermal controller 750 can communicate with the first fan 190a and a second fan 190b. The thermal controller 750 can actuate the first fan 190a and the second fan 190b if it detects a temperature above a preset limit in the outer housing 110. The thermal controller 750 can shut down the first fan 190a and the second fan 190b when the temperature is below the preset limit.

The power controller 755 can control transfer of power to and from the one or more batteries 133, and the power controller 755 can control transfer of power from an external power port 170.

The communication device 714 can be in communication with an antenna 760. The communication device 714 can also be in communication with a switch 712.

The switch 712 can be connected with the communication device 714, the camera 140, the external data port 180, and the battery control system 710. The switch 712 can allow communication between the communication device 714, the external data port 180, the battery control system 710, and the camera 140.

An external device 790 can be in communication with the communication device 714. The external device 790 can communicate with the communication device 714 via the antenna 760.

Figure 8:
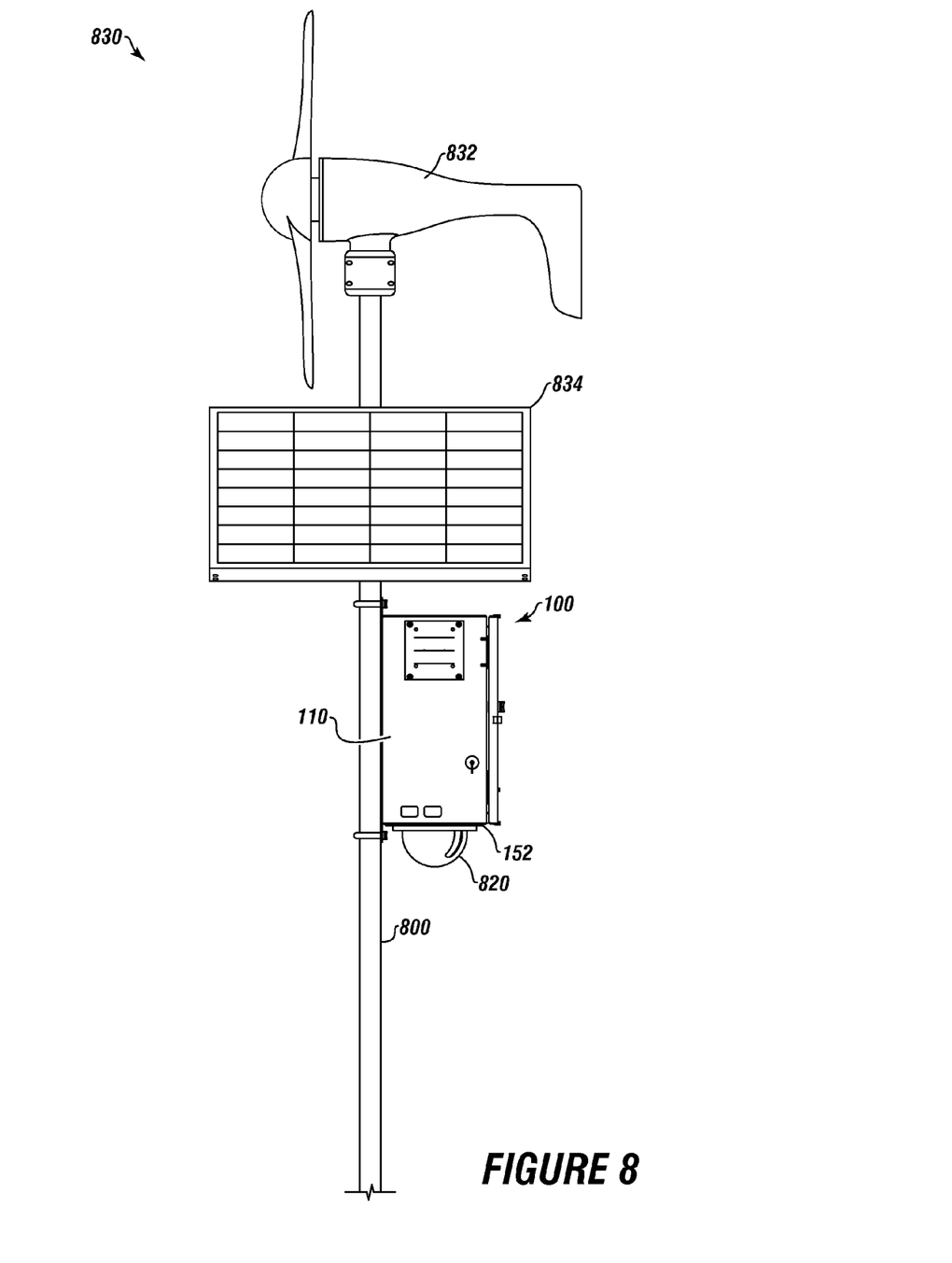
FIG. 8 depicts a security camera enclosure mounted on a pole with an external power source in communication therewith.

FIG. 8 depicts a security camera enclosure mounted on a pole with an external power source in communication therewith.

The security camera enclosure 100 can be mounted on a pole 800. A protective cover 820 can be connected with the outer housing 110. The protective cover 820 can cover the viewing hole and protect the camera. The gasket 152 can be disposed between the protective cover 820 and the outer housing 110.

An external power source 830 can be in communication with the security camera enclosure 100. The external power source 830 is depicted including a solar power system 834 and a wind turbine power system 832.

In one or more embodiments the external power source 830 can be a solar system, a generator, a wind system, grid power, or combinations thereof.

Figure 9:
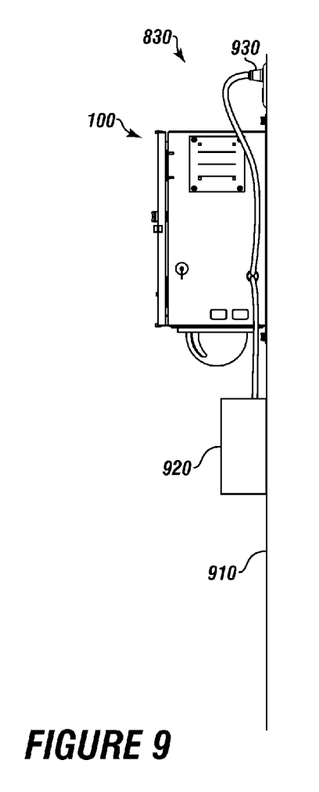
FIG. 9 depicts a security camera enclosure mounted on a structure and in communication with one or more external power sources.

FIG. 9 depicts a security camera enclosure mounted on a structure and in communication with one or more external power sources.

The security camera enclosure 100 can be connected to a structure 910.

The external power source 830 can be in communication with the security camera enclosure 100. The external power source 830 is depicted including a generator 920 and a grid power system 930.

The external power source 830 can be a solar system, a generator, a wind system, grid power, or combinations thereof.

Figure 10:
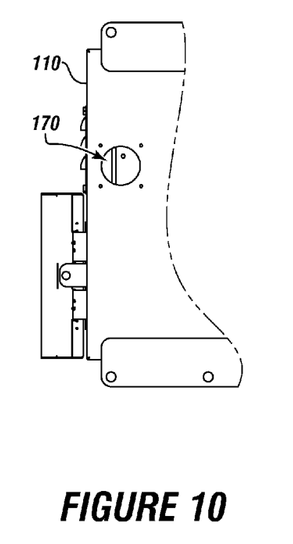
FIG. 10 is a back view of the security camera enclosure cut along line B-B of FIG. 3.

FIG. 10 is a back view of the security camera enclosure cut along line B-B of FIG. 3.

The external power port 170 can be located on a back side of the outer housing 110. The external power port 170 can be aligned with the battery box and located at an elevated position to the top of the battery box.

The external power port 170 can receive one or more power conductors, such as cables. The power conductors can have one or more seals around them and can form a seal with the external power port 170 when operatively connected with the power controller.

While these embodiments have been described with emphasis on the embodiments, it should be understood that within the scope of the appended claims, the embodiments might be practiced other than as specifically described herein.

What is claimed is:

1. A security camera enclosure comprising:
   a. A one piece outer housing;
   b. an internal battery box as a separating housing with five walls and an opening facing an exterior, with a vented battery box door;
   c. a battery located within the internal battery box;
   d. a camera disposed within the one piece outer housing, wherein the camera is connected with the battery, and wherein a lens of the camera is aligned with a viewing hole formed in a bottom portion of the one piece outer housing;
   e. a battery control system in communication with the battery and the camera; and
   f. a thermal controller comprising vents in opposing sidewalls of the one piece outer housing.

2. The security camera enclosure of claim 1, wherein the vents are water proof vents.

3. The security camera enclosure of claim 1, wherein the thermal controller further comprises one or more fans disposed within the one piece outer housing.

4. The security camera enclosure of claim 1, further comprising a communication device in communication with the camera, wherein the communication device is configured to communicate with one or more remote devices.

5. The security camera enclosure of claim 4, further comprising an external data port formed in the one piece outer housing, wherein the external data port is in communication with a switch.

6. The security camera enclosure of claim 5, wherein the switch communicates with the external data port, the camera, the battery control system, and the communication device.

7. The security camera enclosure of claim 6, wherein the camera, the switch, and the communication device are powered by the battery, an external power source in communication with an external power port, or combinations thereof.

8. The security camera enclosure of claim 7, wherein a solar control system in communication with the external power source and the battery regulates power provided to the battery to ensure battery charge is maintained above a predetermined charge level.

9. The security camera enclosure of claim 8, wherein the external power source is a solar system, a generator, a wind system, grid power, or combinations thereof.

10. The security camera enclosure of claim 1, further comprising an access opening formed in the one piece outer housing, wherein a secure access door is connected with the one piece outer housing for selectively blocking the access opening.

11. The security camera enclosure of claim 1, further comprising a first mounting flange connected with the one piece outer housing on a first portion thereof, and a second mounting flange connected with the one piece outer housing on a second portion thereof.

12. The security camera enclosure of claim 1, further comprising a protective cover connected with the one piece outer housing covering the viewing hole.

13. The security camera enclosure of claim 1, further comprising a camera housing disposed within the one piece outer housing, wherein the camera housing supports the camera.

14. The security camera enclosure of claim 1, further comprising a battery box opening in the one piece outer housing, wherein the vented battery box door is connected with the one piece outer housing for selectively blocking the battery box opening.

15. The security camera enclosure of claim 14, wherein the vented battery box door allows gasses from the battery to escape from the one piece outer housing.

16. The security camera enclosure of claim 1, wherein the battery is in communication with the battery control system via a power controller.

\* \* \* \* \*